United States Patent

Perea

Patent Number: 5,102,021
Date of Patent: Apr. 7, 1992

[54] TOOL KIT ASSEMBLY

[76] Inventor: Claude D. Perea, 2595 W. Amherst Ave., Denver, Colo. 80236

[21] Appl. No.: 702,830

[22] Filed: May 20, 1991

Related U.S. Application Data

[63] Continuation of Ser. No. 529,468, May 29, 1990, abandoned.

[51] Int. Cl.⁵ ............................................. B62J 9/02
[52] U.S. Cl. ........................... 224/35; 224/32 R; 224/39; 206/373; 312/DIG. 33
[58] Field of Search ...................... 224/34–36, 224/39, 41, 30 R, 30 A, 31, 32 R, 32 A, 42.03 A, 42.07, 42.08, 319; 206/372, 373; 312/DIG. 33

[56] References Cited

U.S. PATENT DOCUMENTS

| 544,640 | 8/1895 | Leonard | 224/35 |
|---|---|---|---|
| 585,833 | 7/1897 | Reznick | 224/32 R |
| 604,210 | 5/1898 | Glase | 224/35 |
| 605,038 | 5/1898 | Wirt | 224/35 |
| 1,079,286 | 11/1913 | Braidwood | 224/30 R |
| 1,466,906 | 9/1923 | Kerr | 224/42.03 A |
| 1,563,055 | 11/1925 | Whallon | 224/42.03 A |
| 1,575,074 | 3/1926 | Nordgren | 224/42.03 A |
| 1,640,146 | 8/1927 | Donegan | 224/42.07 |
| 1,755,112 | 4/1930 | Gilmore | 224/42.03 A |
| 1,776,890 | 9/1930 | Dart | 224/42.03 A |
| 1,801,443 | 4/1931 | Mesinger | 224/35 X |
| 1,967,002 | 7/1934 | Agee | 224/36 X |
| 2,850,221 | 9/1958 | Brechwald | 224/39 R |
| 3,305,076 | 2/1967 | Fleenor | 312/DIG. 33 X |
| 3,403,878 | 10/1968 | Opay | 224/30 R |
| 3,513,969 | 5/1970 | Roff | 206/372 |
| 3,806,010 | 4/1974 | Utigard | 224/36 X |
| 3,945,544 | 3/1976 | Walker et al. | 224/32 R |
| 4,449,653 | 5/1984 | Pirolli | 224/35 |
| 4,809,890 | 3/1989 | Tsigadas | 224/32 R |
| 4,938,355 | 7/1990 | Rocco | 206/373 X |
| 4,981,243 | 1/1991 | Rogowski | 224/41 |

FOREIGN PATENT DOCUMENTS

| 3837829 | 10/1989 | Fed. Rep. of Germany | 206/372 |
|---|---|---|---|
| 0739557 | 10/1931 | France | 312/DIG. 33 |
| 0419224 | 3/1947 | Italy | 224/32 R |
| 0008804 | of 1912 | United Kingdom | 224/32 A |
| 0026070 | of 1912 | United Kingdom | 224/39 |
| 0014185 | of 1915 | United Kingdom | 224/35 |
| 0429493 | 5/1935 | United Kingdom | 224/32 R |
| 0700931 | 12/1953 | United Kingdom | 224/35 |

*Primary Examiner*—Henry J. Recla
*Assistant Examiner*—Casey Jacyna
*Attorney, Agent, or Firm*—Fields, Lewis, Pittenger & Rost

[57] ABSTRACT

A tool kit assembly for motorcycles and the like preferably mounts on the front steering fork and supports the name plate. The assembly includes an outer housing and a relatively thin rigid tool box that slides into the housing and is rigidly and resiliently fastened thereto. The tools are resiliently held on a plate by flexible loop members which plate is readily removable from and reinsertable into the tool box. A name plate mounts to the front of the outer housing.

12 Claims, 2 Drawing Sheets

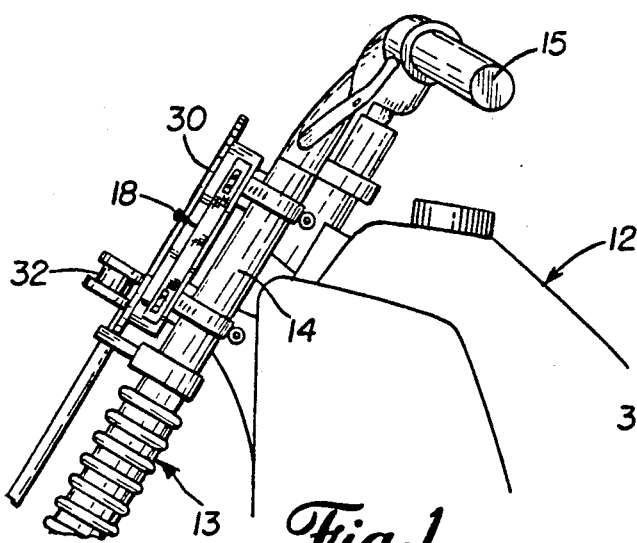
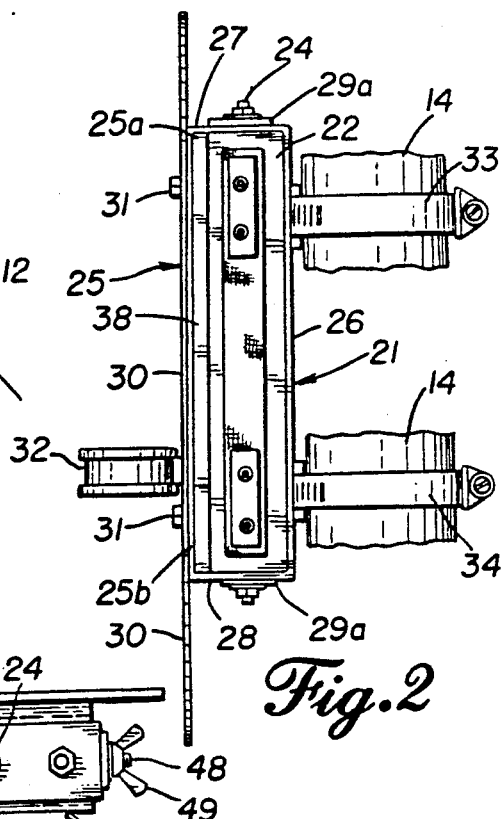
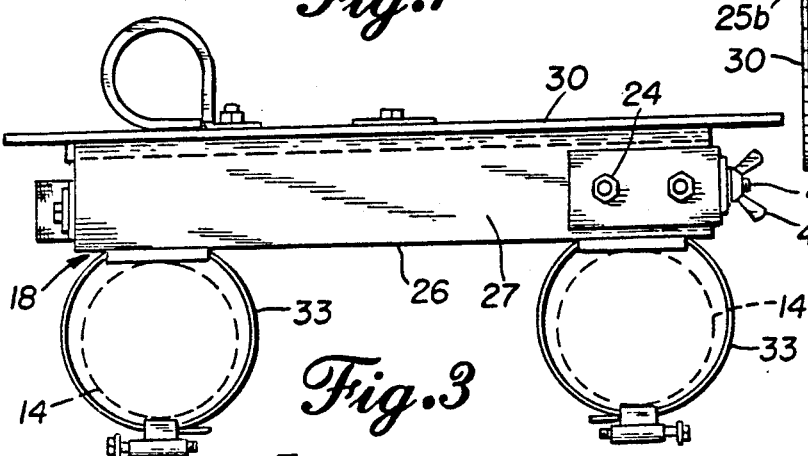
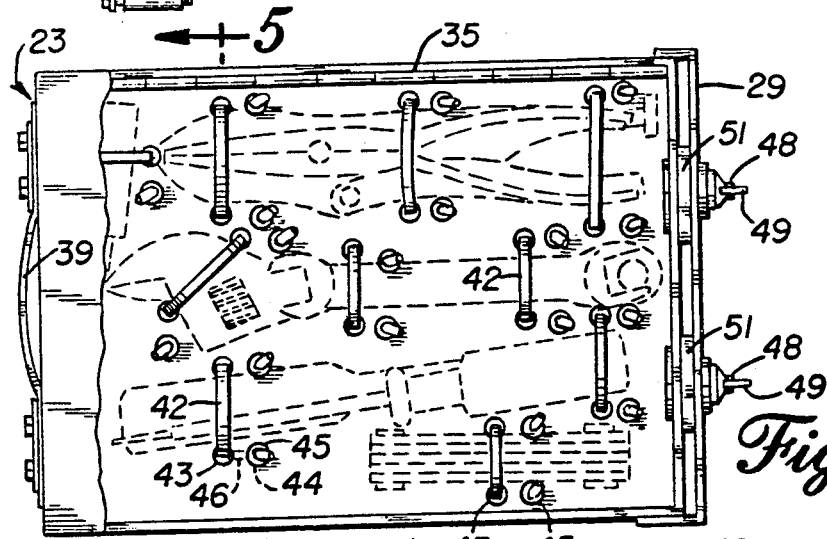
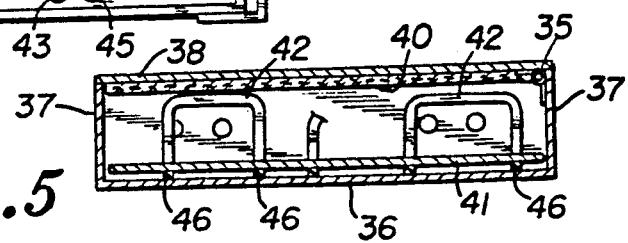

TOOL KIT ASSEMBLY

This application is a continuation of application Ser. No. 529,468, filed May 29, 1990, now abandoned.

TECHNICAL FIELD

This invention relates to a novel and improved tool kit assembly that is particularly suited for carrying tools on a motorcycle and the like.

BACKGROUND ART

In the past, tools such as those suitable for repairing a motorcycle have been generally carried in soft bags on a motorcycle. Some of the problems attendant to this approach are the bulkiness of a soft bag, difficulty in retrieving the tools and keeping them in an orderly fashion and further, there is a tendency for them to rattle during movement of the vehicle of the Invention

DISCLOSURE OF THE INVENTION

A tool kit assembly disclosed includes a tool box that is removably fastened inside an outer housing mounted on the motorcycle, preferably on the front steering fork, and the tool box can be slidably removed from this outer housing. The tools are removably supported in flexible loop members on a support plate that fits inside the tool box and is readily removed therefrom and replaced. A name plate mounts on the front of the outer housing.

BRIEF DESCRIPTION OF DRAWINGS

Details of this invention are described in connection with the accompanying drawings in which like parts bear similar reference numerals and in which:

FIG. 1 is a side elevation view of a tool kit assembly embodying features of the present invention shown mounted on the front steering fork of a motorcycle.

FIG. 2 is a side elevation view of the tool kit assembly shown in FIG. 1.

FIG. 3 is a top plan view of the tool kit assembly shown in FIG. 2.

FIG. 4 is a side elevation view of the tool box removed from the outer housing with a portion of the cover removed to show the interior parts.

FIG. 5 is a sectional view taken along line 5—5 of FIG. 4.

DETAILED DESCRIPTION

Figure 6:
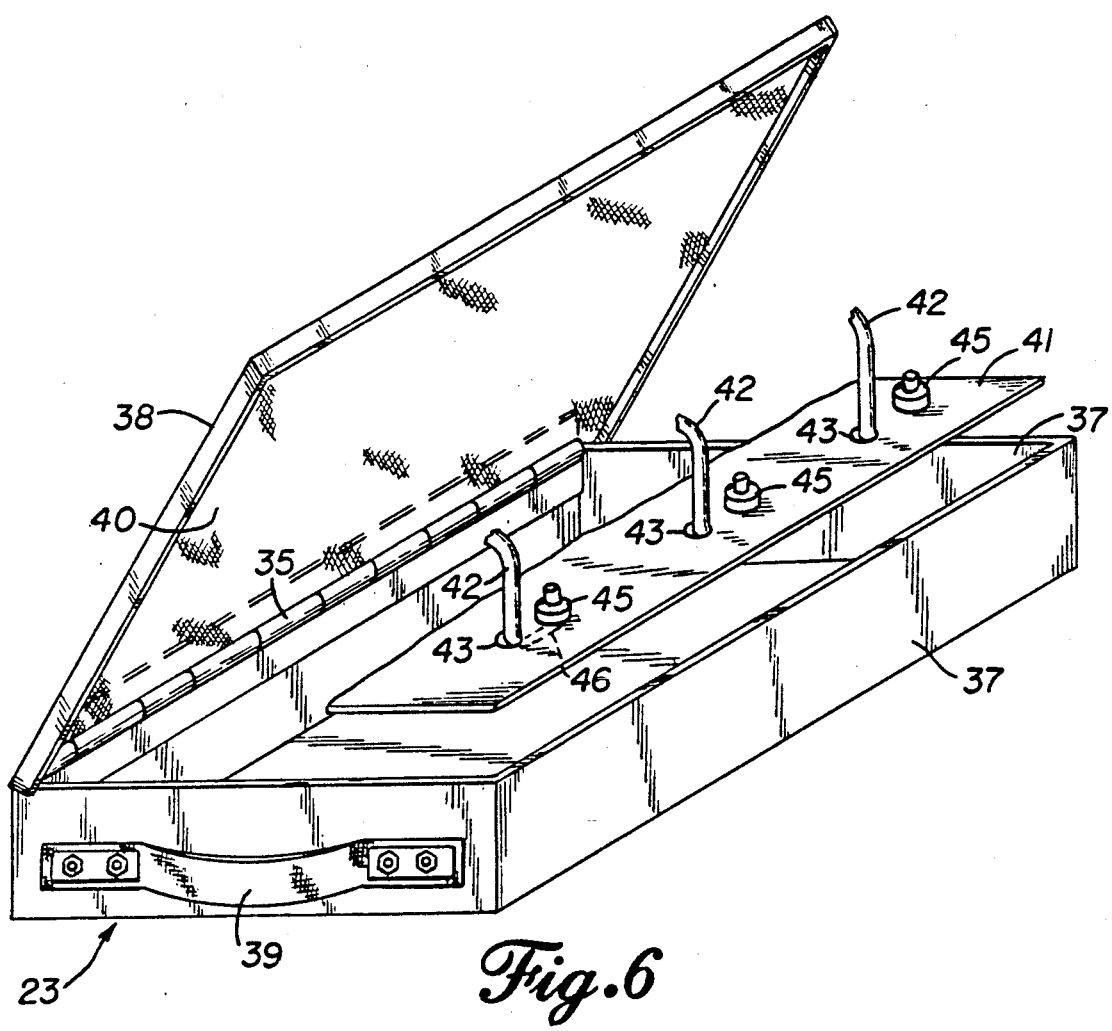
FIG. 6 is a perspective view of the tool box in a removed position from the outer housing with the cover in an open position and the tool holder in a removed position from the tool box.

Referring now to the drawing, there is shown a front portion of a motorcycle 12 having a front steering column 13 including two laterally spaced cylindrical columns or tubular members 14 and a handle bar 15 mounted to the tubular members which when rotated will turn the front wheel (not shown) for steering purposes. The tool kit assembly 18 embodying features of the present invention preferably rigidly mounts to the two tubular members 14.

The tool kit assembly 18 includes a rigid outer housing 21 defining an inner tool-box receiving chamber and a side opening 22 through which a rigid tool box 23 is slidably inserted via the side opening 22. The outer housing shown includes a front wall 25, rear wall 26, top wall 27, bottom wall 28 and side wall 29 arranged and interconnected along adjacent edges to form the inner tool-box receiving chamber. The side wall 29 shown is in the form of a U-shaped member having a pair of end sections 20a that fit over the top and bottom walls and are secured by a pair of bolt-nut fasteners 24. It is understood that wall 29 can be made as an integral part of the outer wall. The front wall 25 shown has a top flange section 25a extending down a distance from the top wall and a bottom flange section 25b extending up from the bottom wall leaving a central space in the front wall. The central space in the front wall affords a degree of flexibility in the outer housing to assist in enabling the tool box to freely slide in and out. It is understood that the front wall could be a single piece without an opening. Both the tool box and outer housing are preferably made of sheet material for strength and rigidity.

For attaching the outer housing to the steering column, there are provided two laterally spaced sets of upper and lower clamps 33 and 34. These clamps are mounted to the rear wall 26. The clamps shown are actuated by turning an externally threaded bolt to contract or enlarge the diameter of the clamp. It is understood that other forms of clamps may be used. A name plate 30 is fastened to the front wall using bolt-nut fasteners 31. An annular antenna support 32 is shown fastened to the front of the name plate.

The tool box 23 has a base wall 36, four upstanding walls 37 extending away from the base wall and defining an access opening and a lid or cover 38 is hinged to one of the free edges of one of the upstanding walls by a hinge 35 to move between open and closed positions. The tool box has an exterior shape that is complementary in shape to the interior compartment of the outer housing. The cover has a resilient cushion layer 40 of rubber or form plastic on the inside surface to bear against the top of the tools to further prevent rattling of the contained tools during transport. A handle 39 is provided on one upstanding wall of the box.

Within the tool box 23 there is provided a removable tool holder which includes a support plate 41 and a plurality of flexible loop members 42 mounted to the support plate and arranged in a preselected pattern for receiving and holding selected tools firmly to the top surface of the support plate. A pair of spaced holes 43 and 44 are provided in the support plate for each loop member. Each loop member 42 is formed by the use of a flexible rubber band or the like having an end portion which extends down through one hole and back out the other hole of each pair and has a knot 45 tied in each end. The loop member has a backfolded end section 46 along the bottom side of the support plate which is resilient and serves as a cushion between plate 41 and the base wall 36. It is understood that other means may be used to fasten the ends of the loop members to the support plate.

The tools shown which are suitable for repairs to a motorcycle are a spark plug socket held by one loop member, a set of allen wrenches held by another loop member, two end to end screw drivers held by a pair of spaced loop members, a crescent and open end wrench held by three spaced loop members and a vice grip and pointed nose pliers held by three spaced loop members. While this pattern or arrangement for the tools has been found suitable for motorcycle tools, it is understood that other patterns and arrangements of the loop members for other tools could be used.

For securing the tool box 23 within the outer housing 21 there is included a pair of externally threaded bolts 48 that are affixed to wall 37 of the tool box and extend through holes in side wall 29 of the outer housing and have nuts 49 that thread on the outer end thereof. A washer-like resilient cushion member 51 fits on each bolt 48 and is disposed between an upstanding wall 37 of the box supporting the bolts and the side wall 29 to cushion the box from the outer housing 21 during transport.

To remove the tool box from the outer housing, the two nuts 49 are removed and the tool box 23 is pulled out from the housing by grasping. The cover is opened and the tools are readily removed from the support plate by being withdrawn from under the loop members and replaced as required. After use the holder is inserted into the tool box and the tool box is inserted back into the outer housing and the nuts 49 threaded on bolts 48.

Although the present invention has been described with a certain degree of particularity, it is understood that the present disclosure has been made by way of example and that changes in details of structure may be made without departing from the spirit thereof.

What is claimed is:

1. A tool kit assembly comprising:
an outer housing having two pairs of spaced, opposed wall portions arranged in a box-like configuration and having an access opening, said front wall of said outer housing being provided by a top flange section extending down from an edge of said top wall and a bottom flange section extending up from an edge of said bottom wall leaving a central space in said front wall,
attaching means to secure said housing to a support,
a tool box received in said outer housing via said access opening, said tool box having two pairs of spaced, opposed wall portions arranged in the same configuration as said housing to be surrounded by said housing and disposed in a close-fitting relation to associated wall portions of said housing with inner surfaces of said housing wall portions providing a guideway for the guided sliding movement of said tool box in said housing, one of said wall portions of one of said two pairs of spaced, opposed wall portions of said housing being a transverse wall portion opposite and spaced from said access opening, one of said wall portions of one of said two pairs of spaced, opposed wall portions of said tool box being adjacent said transverse wall portion, one of said two pairs of spaced, opposed wall portions of said outer housing being top and bottom walls and another of said two pairs of said opposed wall portions of said outer housing being front and rear walls and pair of side walls connect with said top, bottom, front and rear to form a tool box receiving inner compartment, said tool box having a cover arranged to move between an open position to provide access thereinto and a closed position,
means in said tool box to cushion selected tools contained in said box, and
fastening means for releasably securing said tool box in said outer housing whereby said tool box may be readily inserted into and removed from said housing, said fastening means including at least one first releasable fastening portion carried by said one wall portion of said tool box, and a second releasable fastening portion operatively associated with said first releasable fastening portion, one of said releasable fastening portions extending through said transverse wall portion when said tool box is in said outer housing and the other of said releasable fastening portions being outside said transverse wall portion, said fastening portions being operable to draw said one wall portion of said tool box toward said transverse wall portion to provide a wall to wall connected mounting for said tool box within said outer housing.

2. A tool kit assembly as set forth in claim 1 wherein a plate is fastened to said front wall, said plate having indicia for identification purposes.

3. A tool kit assembly as set forth in claim 1 wherein said cover has a cushion layer on the inside surface to bear against the tools when in the closed position.

4. A tool kit assembly as set forth in claim 1 wherein said tool box has a handle to facilitate removal and replacement of said tool box from said outer housing.

5. A tool kit assembly as set forth in claim 1 wherein said first releasable fastening portion includes a pair of spaced externally threaded bolt fasteners extending from said transverse wall portion and through said one wall portion of said outer housing and said second releasable fastening portion is in the form of a wing nut secured to the outer end of each bolt fastener.

6. A tool kit assembly as set forth in claim 5 including resilient cushion members on said bolt fasteners between adjacent walls of said box and said outer housing to cushion said box in said housing.

7. A tool kit assembly as set forth in claim 1 further including resilient cushion means between said transverse wall portion and said one wall portion of said tool box with said fastening means drawing said wall portions against said cushion means to cushion said tool box in said housing.

8. A tool kit assembly comprising:
an outer housing having two pairs of spaced, opposed wall portions arranged in a box-like configuration and having an access opening,
attaching means to secure said housing to a support, said attaching means including clamping means on said housing arranged for fastening to a pair of laterally spaced tubular members which are part of a front steering fork of a motorcycle,
a tool box received in said outer housing via said access opening, said tool box having two pairs of spaced, opposed wall portions arranged in the same configuration as said housing to be surrounded by said housing and disposed in a close-fitting relation to associated wall portions of said housing with inner surfaces of said housing wall portions providing a guideway for the guided sliding movement of said tool box in said housing, one of said wall portions of one of said two pairs of spaced, opposed wall portions of said housing being a transverse wall portion opposite and spaced from said access opening, one of said wall portions of one of said two pairs of spaced, opposed wall portions of said tool box being adjacent said transverse wall portion, said tool box having a cover arranged to move between an open position to provide access thereinto and a closed position,
means in said tool box to cushion selected tools contained in said box, and
fastening means for releasably securing said tool box in said outer housing whereby said tool box may be readily inserted into and removed from said housing, said fastening means including at least one first releasable fastening portion carried by said one wall portion of said tool box, and a second releasable fastening portion operatively associated with said first releasable fastening portion, one of said releasable fastening portions extending through said transverse wall portion when said tool box is in said outer housing and the other of said releasable fastening portions being outside said transverse wall portion, said fastening portions being operable to draw said one wall portion of said tool box toward said transverse wall portion to provide a wall to wall connected mounting for said tool box within said outer housing.

9. A tool kit as set forth in claim 8 wherein said clamping means includes two sets of laterally spaced upper and lower clamps secured to said tool box for encircling associated of said tubular members.

10. A tool kit assembly mounted on a steering fork of a motorcycle comprising:
 a rigid outer housing having two pairs of spaced, opposed wall portions arranged in a box-like configuration and an access opening,
 attaching means securing said housing to said front steering fork,
 a name plate attached to the front of said outer housing,
 a rigid tool box slidably received in said outer housing via said access opening, said tool box having two pairs of spaced, opposed wall portions arranged in the same configuration as said housing to be surrounded by said housing and disposed in a close-fitting relation to associated wall portions of said housing with inner surfaces of said housing wall portions providing a guideway for the sliding movement of said tool box in said housing, one of said wall portions of one of said two pairs of spaced, opposed wall portions of said housing being a transverse wall portion opposite and spaced from said access opening, one of said wall portions of one of said two pairs of spaced, opposed wall portions of said tool box being adjacent said transverse wall portion when said tool box is disposed in said housing, said tool box having a cover arranged to move between an open position to provide access thereinto and a closed position,
 a removable tool holder in said box, said tool holder including a support plate and a plurality of flexible loop members mounted to said support plate for receiving and holding selected tools on said support plate, and
 fastening means for releasably securing said tool box in said outer housing whereby said tool box may be readily inserted into and removed from said housing and said tool holder readily removed from said tool box for access to selected of said tools, and fastening means including at least one first releasable fastening portion carried by said one wall portion of said tool box, and a second releasable fastening portion operatively associated with said first releasable fastening portion, one of said releasable fastening portions extending through said transverse wall portion when said tool box is in said outer housing and the other of said releasable fastening portions being outside said transverse wall portion, said fastening portions being operable to draw said one wall portion of said tool box toward said transverse wall portion to provide a wall to wall connected mounting for said tool box within said outer housing.

11. A tool kit assembly as set forth in claim 10 wherein said support plate has pairs of holes at selected positions, each said loop member including a flexible band having an end portion extending through one hole of each pair and back out the other hole of each pair and having a knot tied in each end to prevent each end of each loop member from pulling through the associated hole, there being a backfolded end section on the bottom side of said support plate.

12. A tool kit assembly as set forth in claim 11 wherein each end section forms a resilient cushion between the bottom of said support plate and said base wall of said tool box.

* * * * *